Feb. 10, 1948. B. W. FREVEL 2,435,648
HOLE CUTTER
Filed Aug. 27, 1945 2 Sheets-Sheet 2
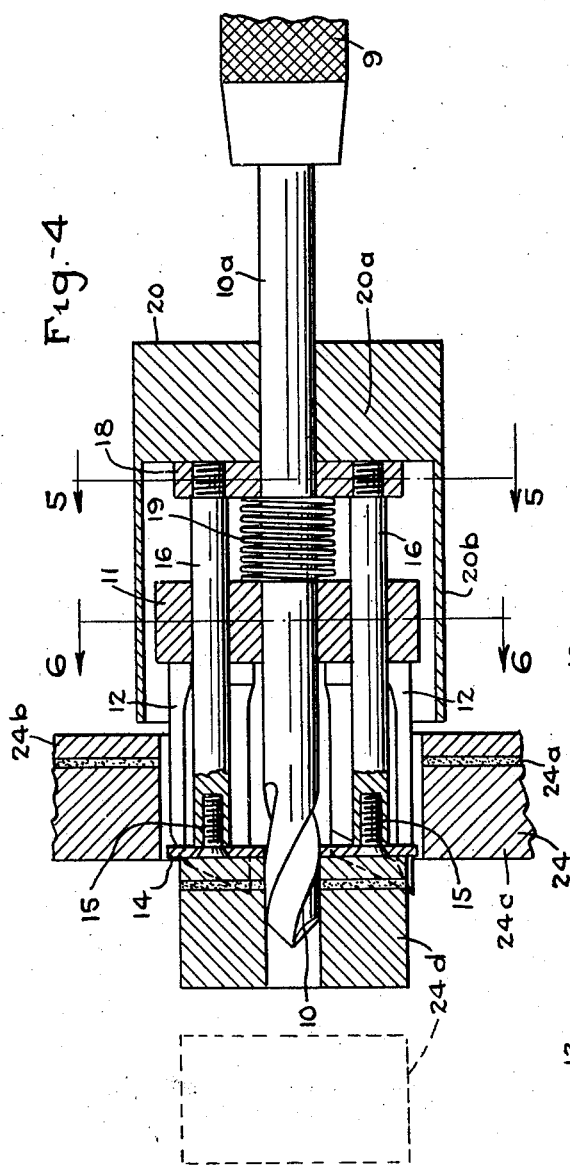
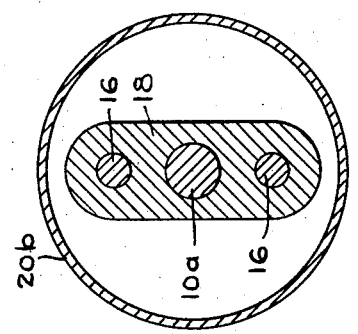
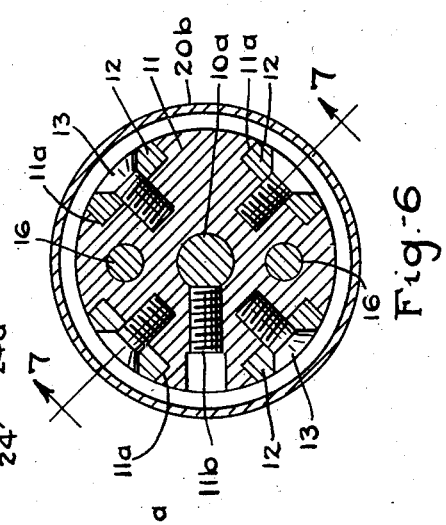
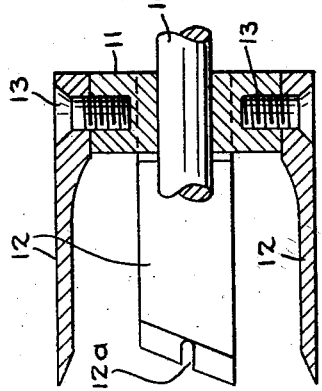
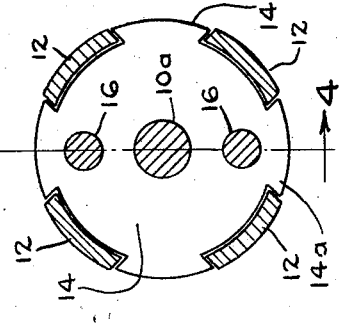
Inventor:
BART W. FREVEL
By Chas. C. Reif
Attorney Patented Feb. 10, 1948

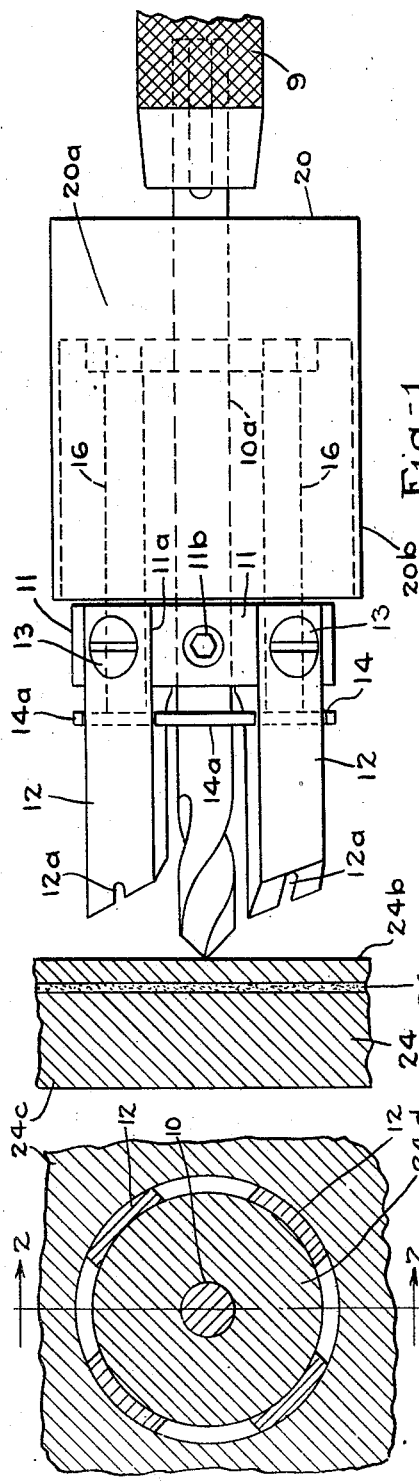
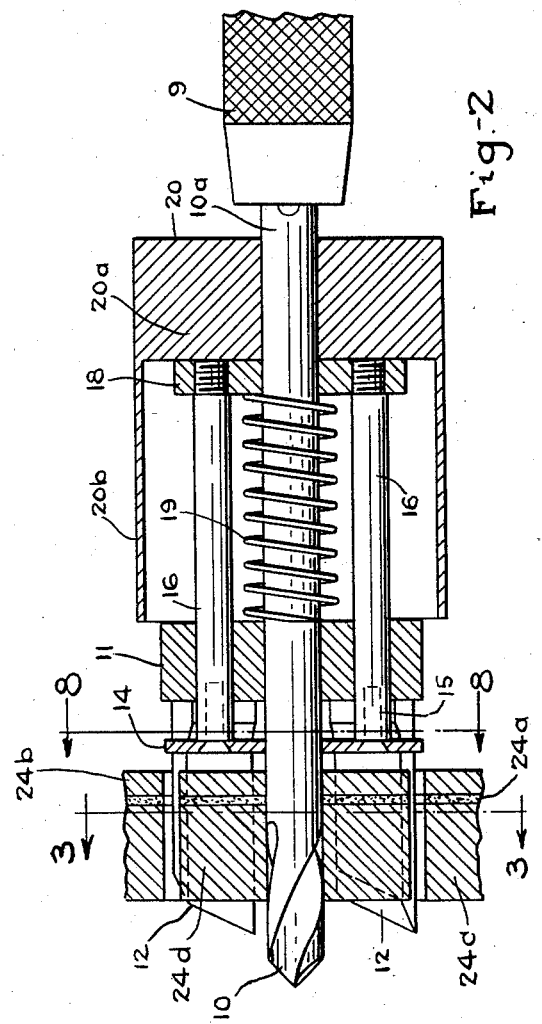

2,435,648

UNITED STATES PATENT OFFICE 2,435,648

HOLE CUTTER

Bart W. Frevel, Minneapolis, Minn.

Application August 27, 1945, Serial No. 612,775

9 Claims. (Cl. 77—69)

1

This invention relates to a hole cutter or to a tool for cutting a hole in a wall or other member. It is often desirable or necessary to cut a cylindrical hole in a wall for the passage of some object such as a pipe or conduit. Tools for this purpose have been used comprising a central lead bit and a cutter of general annular form surrounding the same and comprising circumferentially spaced blades or teeth. In the operation of cutting the hole a cylindrical plug is usually cut from the wall or a board therein and this becomes wedged within the cutter and at the inner sides of said teeth or blades. This plug must be removed and it has been the common practice to stop the cutter and remove the said plug with a screw driver or other implement. The teeth of the cutter often become coated and more or less clogged by asphalt or similar substance used in the insulation on said wall.

It is an object of this invention to provide a simple and efficient structure of hole cutter having means by which a plug of work may be easily and quickly ejected from or removed from the cutter preferably without stopping the cutter.

It is also an object of the invention to provide such a device as set forth in the preceding paragraph, the same also having means for cleaning the teeth of the cutter.

It is a further object of the invention to provide a simple and efficient structure of hole cutter, the same having a cutter of general cylindrical or annular form with circumferentially spaced blades or teeth, a member being provided movable longitudinally between said teeth for ejecting a plug of work, and means movable longitudinally of the cutter and adapted to be grasped and moved by the operator for striking a blow on said member to knock or drive said plug of work from between said teeth or blades.

It is more specifically an object of the invention to provide a hole cutter having a central bit with a rearwardly extending shank adapted to be rotated by some suitable means, a cutter having a hub secured to said bit and comprising a plurality of annularly arranged circumferentially spaced blades having cutting edges at their forward ends, a disk disposed within said cutter and blades, guide rods secured to said disk and extending rearwardly through said hub, a member secured to the rear ends of said guide rods, resilient means between said hub and member for moving said disk rearwardly, and a shell journaled on and slidable longitudinally of said shank, the same having a periphery preferably of cylindrical form adapted to be grasped by the operator and

2 having a weighted hub adapted to strike a blow against said member to move said disk for ejecting a plug of work from between said blades, said shell also having a cylindrical bore at its forward end movable over said blades.

It is still further an object of the invention to provide such a device as set forth in the preceding paragraph, said disk also having radially extending circumferentially spaced projections disposed between said blades for cleaning said blades.

These and other objects and advantages of the invention will be fully set forth in the following description made in connection with the accompanying drawings in which like reference characters refer to similar parts throughout the several views and in which—

Fig. 1 is a view in side elevation of the device showing a chuck for operating the same;

Fig. 2 is a central vertical section taken substantially on line 2—2 of Fig. 3, as indicated by the arrows;

Fig. 3 is a vertical section taken on line 3—3 of Fig. 2, as indicated by the arrows;

Fig. 4 is a vertical section taken substantially on line 4—4 of Fig. 8, as indicated by the arrows;

Fig. 5 is a vertical section taken on line 5—5 of Fig. 4, as indicated by the arrows;

Fig. 6 is a vertical section taken on line 6—6 of Fig. 4, as indicated by the arrows;

Fig. 7 is a vertical section taken on line 7—7 of Fig. 6, as indicated by the arrows; and Fig. 8 is a vertical section taken on line 8—8 of Fig. 2, as indicated by the arrows.

Referring to the drawings, a tool is shown comprising a central bit 10 having a shank 10a extending rearwardly and adapted to be connected to the chuck 9 of a suitable rotating driving means or motor for rotating the tool. Said bit 10 has secured thereto in any suitable manner as by the set screw 11b, a hub 11 illustrated as of general cylindrical form, the same having circumferentially spaced slots or recesses 11a formed in its periphery in which are disposed respectively blades or teeth 12 secured to hub 11 in any suitable manner as by the counter-sunk screws 13. The peripheries of blades or teeth 12 are disposed substantially in a cylinder, as shown in Figs. 3, 6 and 8. Said blades or teeth 12 extend forwardly parallel to bit 10 and have inclined cutting edges at their forward ends disposed a short distance rearwardly of the end of bit 10. The cutting edges of said blades are shown as provided with longitudinally extending open-ended slots 12a. Disposed between blades 12 and within the cutter formed thereby is a disk 14. The outer side or periphery of disk 14 is disposed quite close to the inner arcuate sides of the teeth 12 and said disk is provided with radially extending projections 14a which project outwardly between the teeth or blades 12, as shown in Fig. 8. Said disk is secured in any suitable manner as by the counter-sunk screws 15 to the forward ends of a pair of guide rods 16. Guide rods 16 are fitted in and slidable in the hub 11 and are secured at their rear ends to a member or block 18 apertured to have shank 10a pass therethrough. A compression coiled spring 19 surrounds shank 10a and bears at its front end against the rear side of hub 11 and at its rear end against the front side of bar or block 18. A member or shell 20 is journaled on the shank 10a and slidable longitudinally thereon. Member 20 has at its rear end a hub portion 20a provided with a bore for shank 10a, which hub portion is of considerable thickness so as to be weighted or quite heavy. Member 20 has a forwardly extending shell portion 20b having a substantially cylindrical bore of a diameter to pass over the blades 12.

In operation the tool is driven by a suitable driving means or motor usually electrically driven. The motor is provided with a suitable handle which is held by the operator for manipulating the tool. When a hole is to be made in a wall, such as wall 24 illustrated, the bit 10 is brought against the surface of the wall and pressed thereagainst by the operator. The bit 10 bores a small hole and acts as a leading means for the cutter comprising blades 12. The wall is engaged by the cutting edges of the blades 12 and due to the rotation of these blades a cylindrical hole is cut or bored in the wall. Wall 24 often includes insulating paper 24a containing asphalt or pitch as well as a covering 24b which may be wall board, plaster or other material. The wall also usually includes one or more boards 24c. As the cutter comprising blades 12 is moved forwardly through the wall, a plug 24d forming part of the original wall is formed and this becomes disposed between the teeth 12 as they move through the wall. In the present invention the disk 14 is provided for ejecting the plug 24d and it will be seen that said disk is normally held at the rear part of the cutter comprising blades 12 by the spring 19, as shown in Fig. 2. When the plug 24d is to be ejected the operator grasps the member 20 about its periphery which is suitably formed for this purpose and moves member 20 longitudinally and forwardly on shank 10a. The front side of hub portion 20a engages member 18 and moves the same and guide rods 16 and disk 14 forwardly. The disk 14 engages the rear side of the plug 24d so that said plug can be forced forwardly and ejected from the tool. The plug 24d is often very tightly wedged between the teeth 12 and it requires considerable force to eject or remove it. The weighted or heavy portion 20a is provided so that a strong blow can be delivered against member 18 and the plug 24d thus knocked out. The hub 20a therefore acts as a hammer for delivering a rather heavy blow against the plug 24d. The shell part 20b of member 20 moves over the blades 12 when member 20 is moved forwardly so that the hands of the operator are entirely protected from engaging and being injured by the blades 12. One great advantage of applicant's tool is that member 20 can be operated without stopping the rotation of the tool. It is necessary therefore to protect the operator's hands from the rotating blades 12. As above stated the blades or teeth 12 often become covered and more or less clogged by pitch, asphalt or similar material encountered in the wall. When disk 14 is moved forwardly, as above described, the projections 14a move between the blades or teeth 12 and act to effectively clean any adhering material therefrom. The plug 24d can thus be ejected and the teeth 12 cleaned very quickly. It takes only an instant or two for the operator to slide member 20 forwardly and as stated this can be done while the tool is still running. A great deal of time is thus saved over previous practice in which the tool was stopped and a separate implement was used to eject the plug and clean the teeth.

From the above description it will be seen that I have provided a very simple and efficient structure of hole cutting tool. The structure results in a great convenience to the workman and in a much more rapid operation. The cleaning and ejecting means on the tool can be easily and quickly operated with the tool running and with perfect safety to the operator. The tool has been amply demonstrated in actual practice and has been found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A hole cutter having in combination, a central bit having an extended shank adapted to be rotated by a suitable means, a cutter secured to said bit and comprising annularly arranged circumferentially spaced blades extending longitudinally of said bit, a member movable longitudinally of said bit and disposed between said blades, resilient means urging said member rearwardly longitudinally of said shank and blades, a second member having a weighted portion journaled on and carried on said shank and slidable longitudinally thereof, the same being adapted to strike a blow on said first mentioned member, said second member having a shell portion movable over said blades and having a periphery adapted to be grasped by the operator.

2. The structure set forth in claim 1, said first mentioned member having a periphery movable close to the inner sides of said blades and having projections thereon movable between said blades.

3. A hole cutter having in combination, a central bit having an extended shank adapted to be rotated, a cutter having a hub secured to said bit and comprising annularly arranged circumferentially spaced teeth extending longitudinally of said bit, spaced guide means movable in said hub, a member disposed within said teeth about said bit, resilient means urging said member rearwardly in said cutter and toward said hub, a second member secured to the rear end of said guide means and a shell having a weighted hub journaled on said bit and slidable longitudinally thereon, said shell being adapted to be grasped by the operator and moved to engage said second member and move the same and said first mentioned member and to strike a blow to eject a plug from within said teeth, said shell having a substantially cylindrical bore adapted to be moved over said cutter and teeth.

4. The structure set forth in claim 3, said first mentioned member having radially spaced projections extending outwardly between said teeth for cleaning the same.

5. A hole cutter having in combination, a central bit having a rearwardly extended shank adapted to be rotated, a cylindrical hub secured to said bit, circumferentially spaced blades secured to said hub and projecting forwardly therefrom, the periphery of said blades being disposed substantially in a cylinder, spaced rods slidable in said hub, a disk carried by said rods at their forward ends and disposed within said blades, a bar connecting said rods at their rear ends in the rear of said hub, a compression coiled spring surrounding said shank and disposed between said hub and bar for urging said disk rearwardly, a second member slidable on said shank having a shell portion at its forward end movable over said blades and having a weighted hub adapted to engage said bar to move said disk and eject a plug from between said blades.

6. A hole cutter having in combination, a central bit having a rearwardly extending shank adapted to be rotated, a hub secured to said shank, a plurality of circumferentially spaced blades secured to said hub and extending forwardly therefrom having cutting edges at their forward ends, the outer sides of said blades being disposed substantially in a cylinder, spaced guide members slidable in said hub, a disk secured to the forward ends of said members, a member secured to the rear ends of said guide members in the rear of said hub and apertured to have said shank pass therethrough and a second member having a substantially cylindrical periphery and a weighted hub journaled on and slidable longitudinally on said shank and having a bore at its forward end adapted to pass over said blades whereby said weighted hub can be moved to strike said first mentioned member and move said disk to eject a plug of work from between said blades.

7. A hole cutter having in combination, a central bit having an extended shank adapted to be rotated by a suitable means, a cutter secured to said bit and comprising annularly arranged circumferentially spaced blades extending longitudinally of said bit, a member movable longitudinally of said bit and disposed between said blades, said member having radially extending projections disposed between said blades and means for moving said member longitudinally of said shank to eject a plug of work from between said blades and to clean said blades.

8. A hole cutter having in combination, a central bit having an extended shank adapted to be rotated by suitable means, a cutter secured to said bit and comprising a hub secured to said shank and having annularly arranged circumferentially spaced blades extending outwardly from said hub longitudinally of said bit, a member disposed outwardly of said hub slidable longitudinally of said bit and disposed between said blades, said member being apertured to permit passage of said bit and having a periphery disposed in close proximity to said blades, and a member having an outwardly extending shell adapted to move over said blades mounted on said shank and movable longitudinally thereof, said last mentioned member being adapted to be grasped by the operator for moving said first mentioned member to clean said blades and to eject a plug of work from between said blades.

9. A hole cutter having in combination, a central bit having an extended shank adapted to be rotated by a suitable means, a cutter secured to said bit and comprising a hub, annularly arranged circumferentially spaced blades secured thereto and extending longitudinally of said bit and having cutting edges at their outer ends, a member slidable on said shank longitudinally of said bit, disposed between said blades outwardly of said hub and having a periphery moving in close proximity to said blades, resilient means normally holding said member adjacent the rear ends of said blades and means mounted on said shank and movable longitudinally thereof adapted to be grasped by the operator for moving said member to eject a plug of work from between said blades and to clean said blades.

BART W. FREVEL.

REFERENCES CITED

The following references are of record in the file of this patent:

UNITED STATES PATENTS

| Number | Name | Date |
|---|---|---|
| 337,493 | Hall | Mar. 9, 1886 |
| 359,296 | Tower | Mar. 15, 1887 |
| 1,359,965 | Claudon | Nov. 23, 1920 |
| 2,349,400 | Beckwith | May 23, 1944 |